US012752812B2

(12) United States Patent
Kim et al.

(10) Patent No.: US 12,752,812 B2
(45) Date of Patent: Oct. 6, 2026

(54) CARGO COMPARTMENT DOOR OPEN DRIVING WARNING METHOD AND DEVICE

(71) Applicants: Hyundai Motor Company, Seoul (KR); Kia Corporation, Seoul (KR)

(72) Inventors: Dokon Kim, Hwaseong-Si (KR); Seungmin Kim, Hwaseong-Si (KR); Gwangseob Kim, Hwaseong-Si (KR); Jungmo Yu, Hwaseong-Si (KR); Byoungcheol Jeong, Hwaseong-Si (KR); HyeonSeob Kim, Hwaseong-Si (KR); Chan Seok Choi, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1 day.

(21) Appl. No.: 18/955,711

(22) Filed: Nov. 21, 2024

(65) Prior Publication Data

US 2026/0015002 A1 Jan. 15, 2026

(30) Foreign Application Priority Data

Jul. 10, 2024 (KR) ........................ 10-2024-0090934

(51) Int. Cl.
*B60Q 1/00* (2006.01)
*B60W 50/14* (2020.01)
*B60W 40/08* (2012.01)

(52) U.S. Cl.
CPC ..... *B60W 50/14* (2013.01); *B60W 2040/0809* (2013.01); *B60W 2050/143* (2013.01); *B60W 2300/12* (2013.01); *B60W 2520/10* (2013.01)

(58) Field of Classification Search
CPC ......... B60W 50/14; B60W 2040/0809; B60W 2050/143; B60W 2300/12; B60W 2520/10
USPC ....................................................... 340/425.5
See application file for complete search history.

(56) References Cited

U.S. PATENT DOCUMENTS

| | | | | |
|---|---|---|---|---|
| 5,602,526 | A * | 2/1997 | Read | B60Q 3/30 116/28 R |
| 6,374,766 | B1 * | 4/2002 | Clark | B60Q 1/30 116/28 R |
| 11,230,191 | B1 * | 1/2022 | Yatooma | B60Q 9/00 |
| 2006/0042538 | A1 * | 3/2006 | Schumacher | B60Q 9/00 116/28 R |

(Continued)

*Primary Examiner* — Tai T Nguyen
(74) *Attorney, Agent, or Firm* — MORGAN, LEWIS & BOCKIUS LLP

(57) ABSTRACT

In a cargo compartment door open driving warning method and device for providing an open driving warning for a door of a cargo compartment mounted for cargo loading in a purpose built vehicle (PBV), the cargo compartment door open driving warning method includes: determining whether the vehicle is a cargo vehicle; in response that the processor concludes the vehicle is the cargo vehicle, activating a door open driving warning mode; setting the door open driving warning mode to one of a plurality of predetermined operation modes; detecting a door opening of the cargo compartment; outputting a warning alarm regardless of a speed of the vehicle; determining whether the speed of the vehicle exceeds a predetermined reference speed; and outputting the warning alarm when the speed of the vehicle exceeds the predetermined reference speed.

20 Claims, 5 Drawing Sheets

(56) References Cited

U.S. PATENT DOCUMENTS

| | | | | |
|---|---|---|---|---|
| 2018/0111597 | A1* | 4/2018 | May | B60W 50/0097 |
| 2019/0212443 | A1* | 7/2019 | Nomura | G01S 7/56 |

* cited by examiner

CARGO COMPARTMENT DOOR OPEN DRIVING WARNING METHOD AND DEVICE

CROSS-REFERENCE TO RELATED APPLICATION

The present application claims priority to Korean Patent Application No. 10-2024-0090934 filed on Jul. 10, 2024, the entire contents of which is incorporated herein for all purposes by this reference.

BACKGROUND OF THE PRESENT DISCLOSURE

Field of the Present Disclosure

The present disclosure relates to a cargo compartment door open driving warning method and device, and more specifically, to a cargo compartment door open driving warning method and device that provides an open driving warning for a door of a cargo compartment mounted for cargo loading in a purpose built vehicle (PBV).

Description of Related Art

Purpose Built Vehicles (PBVs) (or purpose built mobility) are electrified and modular mobility, which may be defined as transportation means that are based on personalized design for its intended use. In other words, PBVs are vehicles that are designed and built for a specific purpose or requirement and has a specific function or use in mind, as opposed to a typical passenger vehicle. For example, a PBV may be equipped with a cargo compartment which may load cargo, such as goods or parcels, when it is implemented as a goods delivery vehicle or a parcel delivery vehicle for delivering goods. As another example, when a PBV is implemented as a refrigeration vehicle for transporting temperature-sensitive goods, such as food, pharmaceuticals, or biochemicals, the PBV may be equipped with a cooling system which is capable of precisely controlling the internal temperature to ensure that the goods remain in proper condition until they reach their destination. More recently, connected solutions and services for these PBVs are also being offered to drivers.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a cargo compartment door open driving warning method and device that, when a purpose built vehicle travels with a door of a cargo compartment mounted for loading cargo open, may prevent accidents and provide safety during cargo delivery by warning for the opening of the door of the cargo compartment.

An exemplary embodiment of the present disclosure provides a cargo compartment door open driving warning method for providing an open driving warning for a door of a cargo compartment mounted for cargo loading in a purpose built vehicle (PBV), the cargo compartment door open driving warning method including: determining whether the vehicle is a cargo vehicle; in response that the processor concludes the vehicle is the cargo vehicle, activating a door open driving warning mode; setting the door open driving warning mode to one of a plurality of predetermined operation modes; detecting a door opening of the cargo compartment; when the plurality of operation modes includes a first operation mode and a second operation mode, the door open driving warning mode is the first operation mode, and the door opening of the cargo compartment is detected, outputting a warning alarm regardless of a speed of the vehicle; determining whether the speed of the vehicle exceeds a predetermined reference speed when the door open driving warning mode is the second operation mode and the door opening of the cargo compartment is detected; and outputting the warning alarm when the speed of the vehicle exceeds the predetermined reference speed.

In some exemplary embodiments of the present disclosure, the cargo compartment door open driving warning method may further include: detecting a door closure of the cargo compartment; and terminating an output of the warning alarm when the door closure of the cargo compartment is detected.

In some exemplary embodiments of the present disclosure, the plurality of operation modes may further include a third operation mode, and the cargo compartment door open driving warning method may further include, when the door open driving warning mode is the third operation mode, and the door opening of the cargo compartment is detected, performing driving restriction to prevent the vehicle from moving.

In some exemplary embodiments of the present disclosure, the cargo compartment door open driving warning method may further include: detecting a door closure of the cargo compartment; and terminating the driving restriction when the door closure of the cargo compartment is detected.

In some exemplary embodiments of the present disclosure, the cargo compartment door open driving warning method may further include: outputting a user interface querying a driver of the vehicle for releasing the driving restriction; and terminating the driving restriction when the driver requests the releasing of the driving restriction via the user interface.

In some exemplary embodiments of the present disclosure, the performing of the driving restriction to prevent the vehicle from moving may include outputting the warning alarm along with the performing of the driving restriction.

In some example embodiments, the determining of whether the vehicle is the cargo vehicle may include: detecting receipt of a latch signal for the door of the cargo compartment; and determining that the vehicle is the cargo vehicle when the receipt of the latch signal for the door of the cargo compartment is detected.

In some exemplary embodiments of the present disclosure, the cargo compartment door open driving warning method may further include automatically activating the door open driving warning mode in an operation mode designated as a default among the plurality of operation modes when the receipt of the latch signal for the door of the cargo compartment is detected.

In some exemplary embodiments of the present disclosure, the setting of the door open driving warning mode may include receiving a setting of the door open driving warning mode from the driver via a user terminal of the driver in communication with the vehicle.

In some exemplary embodiments of the present disclosure, the output of the warning alarm may be performed through a user terminal of a driver communicating with the vehicle.

Another exemplary embodiment of the present disclosure provides a cargo compartment door open driving warning device for providing an open driving warning for a door of a cargo compartment mounted for cargo loading in a purpose built vehicle (PBV) by executing a program code loaded in one or more memory devices through one or more processors, in which the program code is executed to determine whether the vehicle is a cargo vehicle, in response that the processor concludes the vehicle is the cargo vehicle, activate a door open driving warning mode, set the door open driving warning mode to one of a plurality of predetermined operation modes, detect a door opening of the cargo compartment, when the plurality of operation modes includes a first operation mode and a second operation mode, the door open driving warning mode is the first operation mode, and the door opening of the cargo compartment is detected, output a warning alarm regardless of a speed of the vehicle, determine whether the speed of the vehicle exceeds a predetermined reference speed when the door open driving warning mode is the second operation mode and the door opening of the cargo compartment is detected, and output the warning alarm when the speed of the vehicle exceeds the predetermined reference speed.

In some exemplary embodiments of the present disclosure, the program code may be executed to further detect a door closure of the cargo compartment, and terminate an output of the warning alarm when the door closure of the cargo compartment is detected.

In some exemplary embodiments of the present disclosure, the plurality of operation modes may further include a third operation mode, and the program code may be executed to Furthermore, when the door open driving warning mode is the third operation mode, and the door opening of the cargo compartment is detected, perform driving restriction to prevent the vehicle from moving.

In some exemplary embodiments of the present disclosure, the program code may be executed to further detect a door closure of the cargo compartment, and terminate the driving restriction when the door closure of the cargo compartment is detected.

In some exemplary embodiments of the present disclosure, the program code may be executed to further output a user interface querying a driver of the vehicle for releasing the driving restriction, and terminate the driving restriction when the driver requests the releasing of the driving restriction via the user interface.

In some exemplary embodiments of the present disclosure, the performing of the driving restriction to prevent the vehicle from moving may include outputting the warning alarm along with the performing of the driving restriction.

In some example embodiments, the determining of whether the vehicle is the cargo vehicle may include: detecting receipt of a latch signal for the door of the cargo compartment; and determining that the vehicle is the cargo vehicle when the receipt of the latch signal for the door of the cargo compartment is detected.

In some exemplary embodiments of the present disclosure, the program code may be executed to further automatically activate the door open driving warning mode in an operation mode designated as a default among the plurality of operation modes when the receipt of the latch signal for the door of the cargo compartment is detected.

In some exemplary embodiments of the present disclosure, the setting of the door open driving warning mode may include receiving a setting of the door open driving warning mode from the driver via a user terminal of the driver in communication with the vehicle.

In some exemplary embodiments of the present disclosure, the output of the warning alarm may be performed through a user terminal of a driver communicating with the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
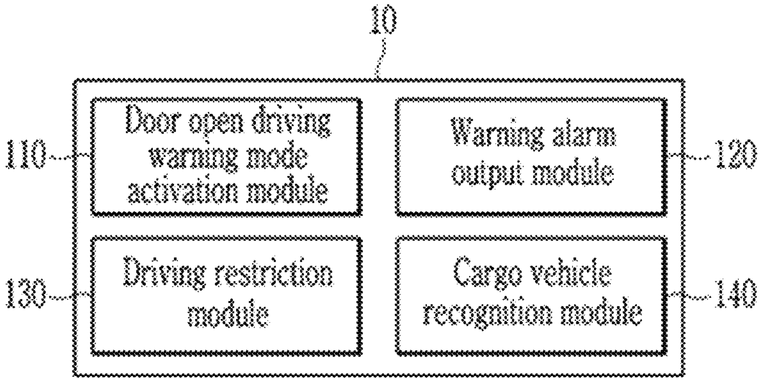
FIG. 1 is a diagram illustrating a cargo compartment door open driving warning device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which example embodiments of the present disclosure are shown. As those skilled in the art would realize, the described example embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word "comprise", and variations such as "comprises" or "comprising", will be understood to imply the inclusion of stated elements but not the exclusion of any other elements. Terms including an ordinary number, such as first and second, are used for describing various components, but the components are not limited by the terms. The terms are used only to discriminate one component from another component.

Terms such as "part," "unit," "module," and the like in the specification may refer to a unit configured for performing at least one function or operation described herein, which may be implemented in hardware or circuitry, software, or a combination of hardware or circuitry and software. Furthermore, at least some of the configurations or functions of cargo compartment door open driving warning method and device according to the example embodiments described below may be implemented as programs or software, and the programs or software may be stored on a computer-readable medium.

FIG. 1 is a diagram illustrating a cargo compartment door open driving warning device according to an exemplary embodiment of the present disclosure.

Referring to FIG. 1, a cargo compartment door open driving warning device 10 according to an exemplary embodiment of the present disclosure may execute program codes or instructions loaded into one or more memory devices via or more processors. For example, the cargo compartment door open driving warning device 10 may be implemented as a computing device 50, such as that described later with reference to FIG. 5. In the instant case, the one or more processors may correspond to a processor 510 of the computing device 50, and the one or more memory devices may correspond to a memory 520 of the computing device 50. Program codes or instructions may be executable by one or more processors to perform a function of providing an open driving warning for a door in a cargo compartment of a purpose built vehicle (PBV) provided for loading cargo. In the present specification, the term "module" is used to logically distinguish between these functions performed by program code or instructions.

The cargo compartment door open driving warning device 10 according to the exemplary embodiment of the present disclosure may include a door open driving warning mode activation module 110, a warning alarm output module 120, a driving restriction module 130, and a cargo vehicle recognition module 140.

The door open driving warning mode activation module 110 may activate a door open driving warning mode in the vehicle. Here, the door open driving warning mode may provide a function to alert the driver when driving occurs with the door of the cargo compartment of the vehicle open. In some exemplary embodiments of the present disclosure, the cargo compartment may be mounted at the rear of a cabin where a driver or a passenger is seated, for cargo loading in the PBV. In some exemplary embodiments of the present disclosure, the PBV may be implemented as a chassis-cab platform-based vehicle including a chassis and a cabin, and the cargo compartment may be mounted on the chassis of the chassis-cab platform-based vehicle. As will be described later, the door open driving warning mode activation module 110 may activate the door open driving warning mode when the vehicle is recognized as a cargo vehicle by the cargo vehicle recognition module 140.

In the meantime, the door open driving warning mode activation module 110 may set the door open driving warning mode to one of a plurality of predetermined operation modes. In some exemplary embodiments of the present disclosure, the plurality of operation modes may include a first operation mode. The first operation mode may be an operation mode that outputs a warning alarm regardless of the speed of the vehicle when a door opening of the cargo compartment is detected. In some exemplary embodiments of the present disclosure, the plurality of operation modes may include a second operation mode. The second operation mode may be an operation mode that outputs a warning alarm only when the speed of the vehicle exceeds a predetermined reference speed (e.g., 10 kph), even when a door opening of the cargo compartment is detected. In the meantime, in some exemplary embodiments of the present disclosure, the plurality of operation modes may include a third operation mode. The third operation mode may be an operation mode that is configured to perform a driving restriction to prevent the vehicle from moving when the door opening of the cargo compartment is detected.

In some exemplary embodiments of the present disclosure, a driver may set the door open driving warning mode that the driver wishes to operate via an in-vehicle device which is configured for interacting with the driver, such as in-vehicle infotainment (IVI). In-vehicle infotainment (IVI) refers to an integrated multimedia and information system in a vehicle, designed to provide entertainment, navigation, and connectivity for drivers and passengers. IVI systems often include features such as GPS navigation, music and video streaming, smartphone integration, and voice-activated controls to enhance ease of use and safety. Additionally, advanced IVI systems may offer internet connectivity, vehicle diagnostics, and rear-seat entertainment options, creating a comprehensive, interactive experience within the vehicle. In some other exemplary embodiments of the present disclosure, the driver may set the door open driving warning mode that the driver wishes to operate via a user terminal which is in communication with the vehicle. Herein, the user terminal may include, for example, a computing device, including a smartphone, a tablet computer, a wearable device, and a laptop computer.

The warning alarm output module 120 may detect the opening of the door in the cargo compartment and output a warning alarm based on the set operation mode. Detecting the opening of the door may be performed by a door contact sensor, which senses the change in contact as the door opens and closes, and may be implemented in various forms such as a Hall sensor, optical sensor, or pressure sensor. In some exemplary embodiments of the present disclosure, the warning alarm output module 120 may output a warning alarm regardless of the speed of the vehicle when the door open driving warning mode is the first operation mode and the door opening of the cargo compartment is detected. In some exemplary embodiments of the present disclosure, the warning alarm output module 120 may be configured to determine whether the speed of the vehicle exceeds a predetermined reference speed (e.g., 10 kph) when the door open driving warning mode is the second operation mode and the door opening of the cargo compartment is detected. When the speed of the vehicle exceeds the predetermined threshold speed, the warning alarm output module 120 may output a warning alarm.

The warning alarm output module 120 may detect the close of the door of the cargo compartment, and terminate the output of the warning alarm when the door closure of the cargo compartment is detected. The driving restriction module 130 may detect the door opening of the cargo compartment and perform driving restrictions based on the set operation mode. In some exemplary embodiments of the present disclosure, the driving restriction module 130 may perform a driving restriction to prevent the vehicle from travelling when the door open driving warning mode is the third operation mode and the door opening of the cargo compartment is detected. In some exemplary embodiments of the present disclosure, the driving restriction module 130 may output a warning alarm along with performing the driving restriction.

In some exemplary embodiments of the present disclosure, the warning alarm output module 120 may output a warning alarm to notify the driver that the vehicle is moving with the door of the cargo compartment open, in a visual, audible, tactile form, or the like. For example, the warning alarm output module 120 may output a warning alarm through an in-vehicle device which is configured for interacting with the driver, such as an IVI, in a form of a visual representation on the screen of the IVI or a sound. In another example, the warning alarm output module 120 may output a warning alarm via a user terminal in communication with the driver's vehicle in a form of a visual representation on a screen, a sound, or a vibration. Herein, the user terminal may include, for example, a computing device, including a smartphone, a tablet computer, a wearable device, and a laptop computer.

The driving restriction module 130 may detect the closing of the door of the cargo compartment, and when the door of the cargo compartment is detected to be closed, terminate the driving restriction. In some exemplary embodiments of the present disclosure, the driving restriction module 130 may query the driver of the vehicle to release the driving restriction while performing the driving restriction. The driving restriction module 130 may output a user interface that queries the driver of the vehicle to release the driving restriction, and when the driver requests to release the driving restriction via the user interface, the driving restriction module 130 may terminate the driving restriction.

The cargo vehicle recognition module 140 may be configured to determine whether the vehicle is a cargo vehicle. Here, a cargo vehicle may be a vehicle provided with a cargo compartment, such as a goods delivery vehicle or a parcel delivery vehicle, which is configured for loading cargo, such as goods or parcels. When it is determined by the cargo vehicle recognition module 140 that the vehicle is the cargo vehicle, the door open driving warning mode activation module 110 may activate the door open driving warning mode described above.

In some exemplary embodiments of the present disclosure, the cargo vehicle recognition module 140 may detect the receipt of a latch signal for the door of the cargo compartment, and when the receipt of the latch signal is detected, determine that the vehicle is the cargo vehicle. In contrast, when the receipt of the latch signal for the door of the cargo compartment is not detected, the cargo vehicle recognition module 140 cannot determine that the vehicle is a cargo vehicle. In some exemplary embodiments of the present disclosure, when the receipt of the latch signal is detected, the door open driving warning mode activation module 110 may automatically activate the door open driving warning mode, with an operation mode designated as the default among the plurality of operation modes of the door open driving warning mode.

In this regard, the door open driving warning mode activation module 110 may receive a door open driving warning mode setting from the driver regarding which of the plurality of operation modes is to be designated as the default operation mode. For example, when the driver designates a first operation mode as the default, the door open driving warning mode activation module 110 may automatically activate the door open driving warning mode as the first operation mode when the receipt of the latch signal for the door of the cargo compartment is detected. In contrast, when the driver designates a second operation mode as the default, the door open driving warning mode activation module 110 may automatically activate the door open driving warning mode as the second operation mode when the receipt of the latch signal for the door of the cargo compartment is detected.

In some exemplary embodiments of the present disclosure, the driver may set the default operation mode through an in-vehicle device which is configured for interacting with the driver, such as an IVI. In some other exemplary embodiments of the present disclosure, the driver may set the default operation mode via a user terminal in his or her possession that communicates with the vehicle. Herein, the user terminal may include, for example, a computing device, including a smartphone, a tablet computer, a wearable device, and a laptop computer.

A goods delivery vehicle or a parcel delivery vehicle which may be loaded with cargo, such as goods or parcels, may often be moving in a delivery area with a door (e.g., a rear twin swing door) open. In the case of a door which is magnetically held open and secured (e.g., a rear twin swing door which is magnetically held open and secured), there is a possibility that the door may be unlocked by a road impact while the vehicle is moving, resulting in personal damage or material damage. Furthermore, manufacturers may be at risk of manufacturer negligence when the vehicles are not provided with a warning alarm.

According to the present example embodiment, the above-described human damage or material damage may be prevented by generating a warning alarm or taking measures to prevent moving when the vehicle travels with the cargo compartment door open. Furthermore, convenience may be provided, such as allowing the driver to activate or deactivate the cargo compartment door open driving warning function, set the door open driving warning mode that the driver wishes to operate, or set a default operation mode.

Figure 2:
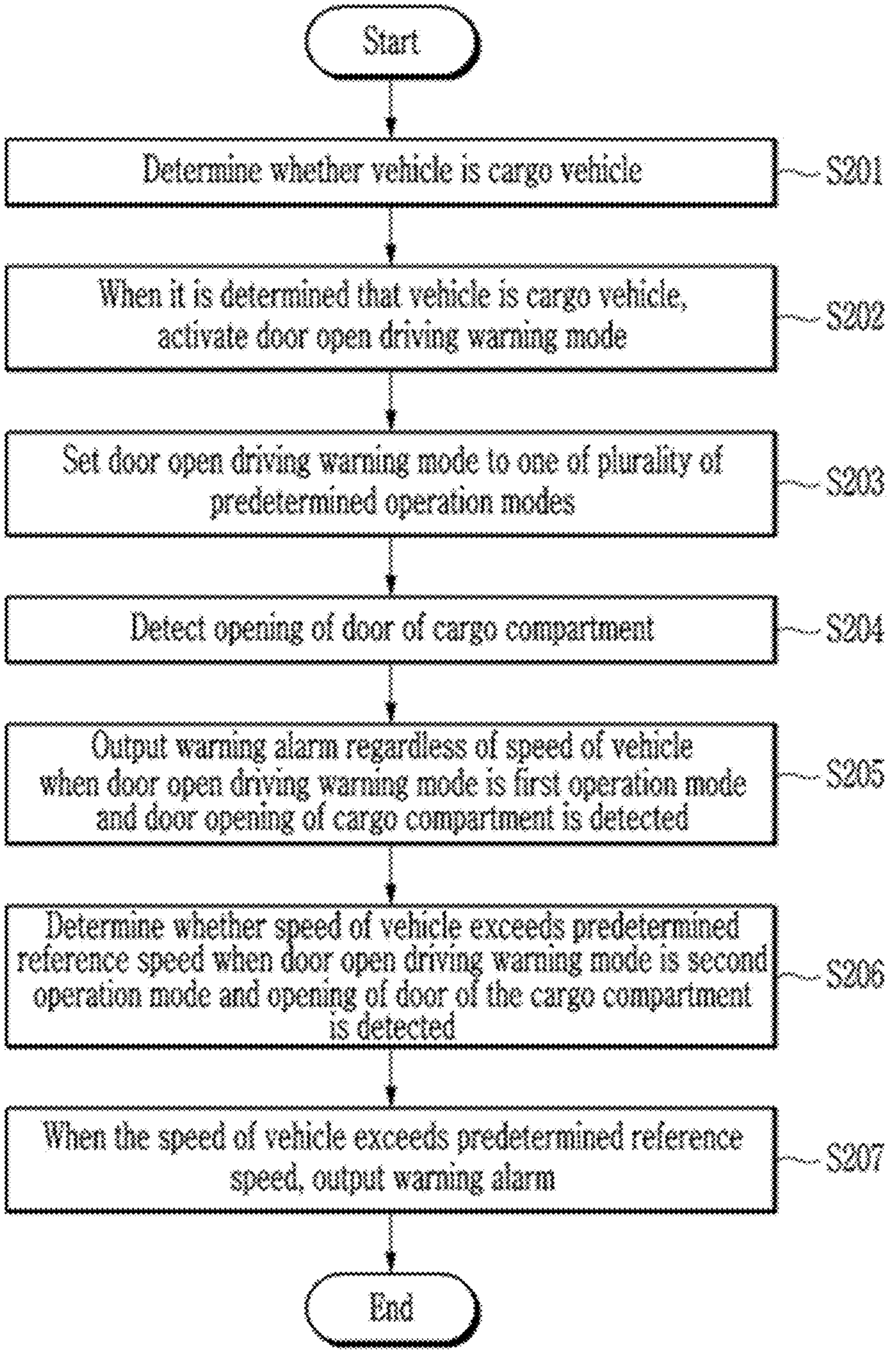
FIG. 2 is a diagram illustrating a cargo compartment door open driving warning method according to an exemplary embodiment of the present disclosure.

FIG. 2 is a diagram illustrating a cargo compartment door open driving warning method according to an exemplary embodiment of the present disclosure.

Referring to FIG. 2, the cargo compartment door open driving warning method may include determining whether a vehicle is a cargo vehicle (S201), when it is determined that the vehicle is a cargo vehicle, activating a door open driving warning mode (S202), setting the door open driving warning mode to one of a plurality of predetermined operation modes (S203), detecting an opening of a door of a cargo compartment (S204), outputting a warning alarm regardless of a speed of the vehicle when the door open driving warning mode is a first operation mode and a door opening of the cargo compartment is detected (S205), determining whether the speed of the vehicle exceeds a predetermined reference speed when the door open driving warning mode is a second operation mode and the opening of the door of the cargo compartment is detected (S206), and when the speed of the vehicle exceeds the predetermined reference speed, outputting a warning alarm (S207).

For further details of the method, reference may be made to the description of the example embodiments described herein, so that duplicative descriptions are omitted herein.

Figure 3:
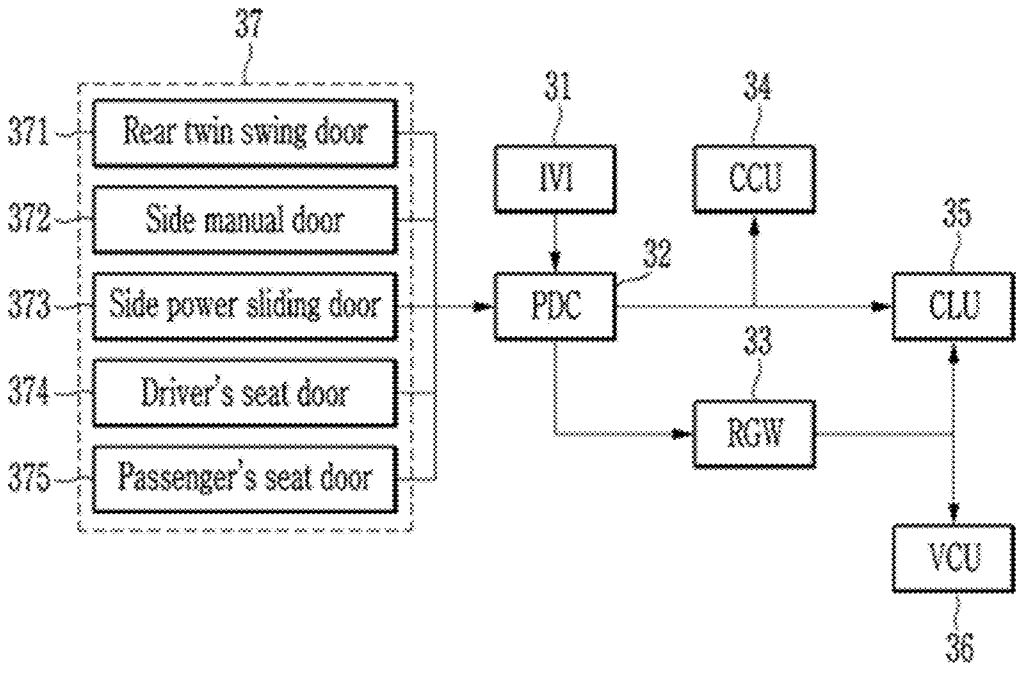
FIG. 3 and FIG. 4 are diagrams illustrating examples of implementations of the cargo compartment door open driving warning methods and devices according to example embodiments.
Figure 4:
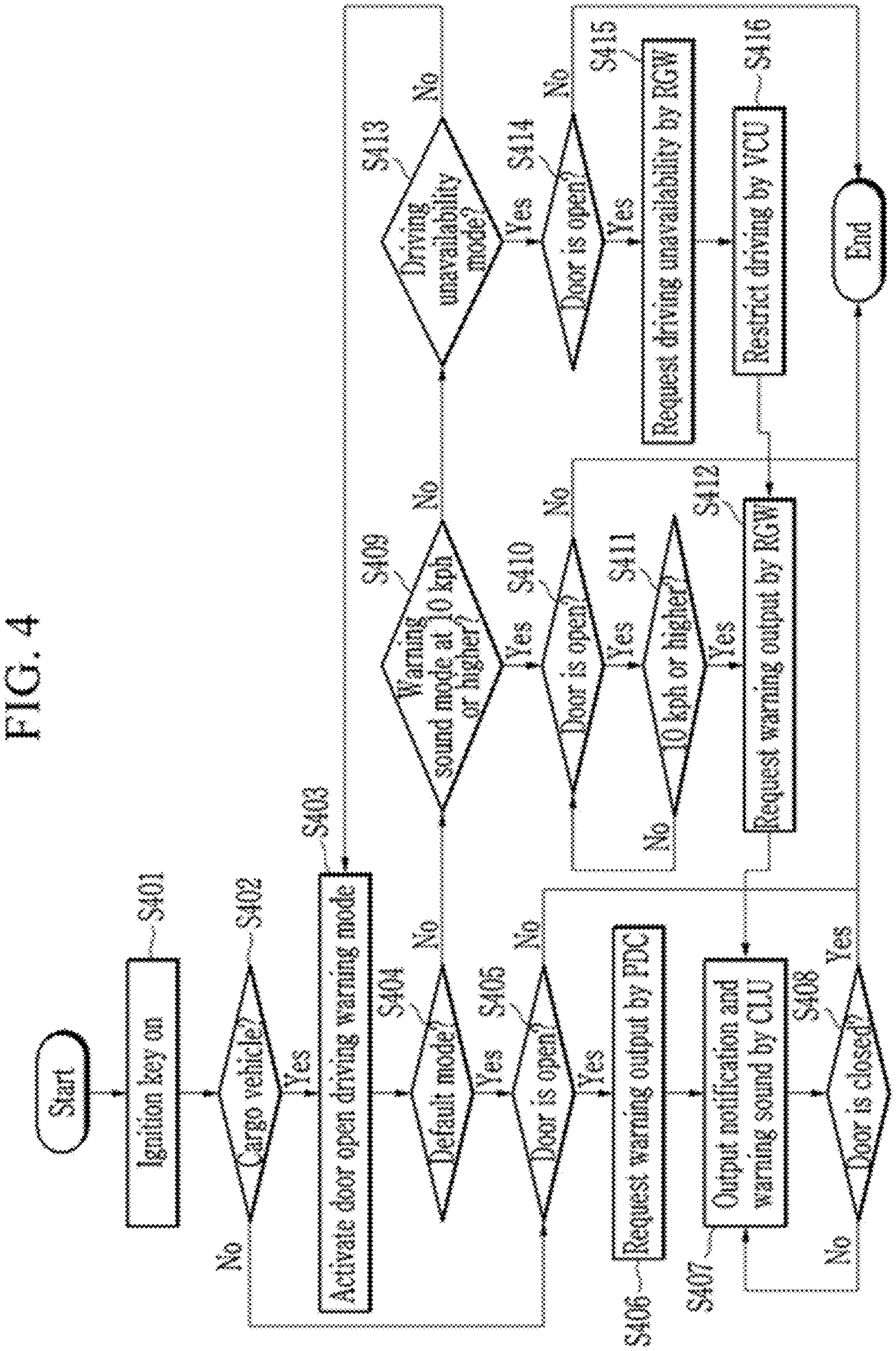

FIG. 3 and FIG. 4 are diagrams illustrating examples of implementations of the cargo compartment door open driving warning methods and devices according to example embodiments.

Referring to FIG. 3, a vehicle may include an IVI 31, a powernet domain controller (PDC) 32, a redundant gate way (RGW) 33, a central communication unit (CCU) 34, a cluster (CLU) 35, and a vehicle control unit (VCU). Furthermore, the vehicle may include a plurality of doors 37. The plurality of doors 37 may include a rear twin swing door 371, a side manual door 372, a side power sliding door 373, a driver's seat door 374, and a passenger's seat door 375. Here, the driver's seat door 374 and the passenger's seat door 375 may be doors provided in a cabin where a driver or passenger gets in the PBV, and the rear twin swing door 371, the side manual door 372, and the side power sliding door 373 may be doors provided in a cargo compartment provided at the rear of the cabin for cargo loading in the PBV.

Referring to FIG. 4, the cargo compartment door open driving warning method performed by the cargo compartment door open driving warning device 10 according to the exemplary embodiment of the present disclosure may include setting, by a driver, an ignition key to an on state (S401) and determining whether a vehicle is a cargo vehicle (S402). In some exemplary embodiments of the present disclosure, the PDC 32 may detect receipt of a latch signal of at least one of the rear twin swing door 371, the side manual door 372, and the side power sliding door 373. When the receipt of the latch signal is detected by the PDC 32, it may be determined that the vehicle is a cargo vehicle.

When it is not determined that the vehicle is a cargo vehicle (S402, No), the method may proceed to operation S405 to be described later. Alternatively, when it is determined that the vehicle is the cargo vehicle (S402, Yes), the method may perform activating the door open driving warning mode (S403) and determining whether the set door open driving warning mode is a first operation mode (i.e., a default mode) (S404). When it is determined that the set door open driving warning mode is the first operation mode (S404, Yes), the method may perform detecting a door opening of the cargo compartment (S405).

When the door opening of the cargo compartment is not detected (S405, No), the method may terminate. Alternatively, when the door opening of the cargo compartment is detected (S405, Yes), the method may perform requesting a warning output by the PDC 32 (S406), outputting a notification and a warning sound by the CLU 35 (S407), and detecting a door closure of the cargo compartment (S408). In some exemplary embodiments of the present disclosure, operation S407 may further include outputting the notification and the warning sound to a user terminal in communication with the vehicle in the possession of the driver via the CCU 34.

When the door closure of the cargo compartment door is detected (S408, Yes), the method may terminate the output of the notification and the warning sound. When the door closure of the cargo compartment is not detected (S408, No), the method may proceed to operation S407.

When it is determined that the set door open driving warning mode is not the first operation mode (S404, No), the method may perform determining whether the set door open driving warning mode is a second operation mode (i.e., a mode of outputting the warning sound at a predetermined speed (e.g., 10 kph) or higher) (S409). When it is determined that the set door open driving warning mode is a second operation mode (S409, Yes), the method may perform detecting a door opening of the cargo compartment (S410).

When the door opening of the cargo compartment is not detected (S410, No), the method may terminate. Alternatively, when the opening of the door of the cargo compartment is detected (S410, Yes), the method may determine whether the speed of the vehicle is greater than or equal to a predetermined speed (e.g., 10 kph).

When the speed of the vehicle is less than the predetermined speed (e.g., 10 kph) (S411, No), the method may proceed to operation S410. In contrast, when the speed of the vehicle is greater than or equal to the predetermined speed (e.g., 10 kph) (S411, Yes), the method may perform requesting an warning output by the RGW 33 (S412), outputting a notification and a warning sound by the CLU 35 (S407), and detecting a door closure of the cargo compartment (S408).

When the door closure of the cargo compartment is detected (S408, Yes), the method may terminate the output of the notification and the warning sound. When the door closure of the cargo compartment is not detected (S408, No), the method may proceed to operation S407.

When it is determined that the set door open driving warning mode is not the second operation mode (S409, No), the method may perform determining whether the set door open driving warning mode is a third operation mode (i.e., a driving unavailability mode) (S413). When it is determined that the set door open driving warning mode is the third operation mode (S413, Yes), the method may perform detecting a door opening of the cargo compartment (S414). In contrast, when it is determined that the set door open driving warning mode is not the third operation mode (S413, No), the method may proceed to operation S403.

When the door opening of the cargo compartment is not detected (S414, No), the method may terminate. Alternatively, when the door opening of the cargo compartment is detected (S414, Yes), the method may perform requesting driving unavailability by the RGW 33 (S415), performing a driving restriction by the VCU 36 (S416), requesting a warning output by the RGW 33 (S412), outputting a notification and a warning sound by the CLU 35 (S407), and detecting the door closure of the cargo compartment (S408).

When the door closure of the cargo compartment is detected (S408, Yes), the method may terminate the output of the notification and the warning sound and release the driving restriction. When the door closure of the cargo compartment is not detected (S408, No), the method may proceed to operation S407.

Figure 5:
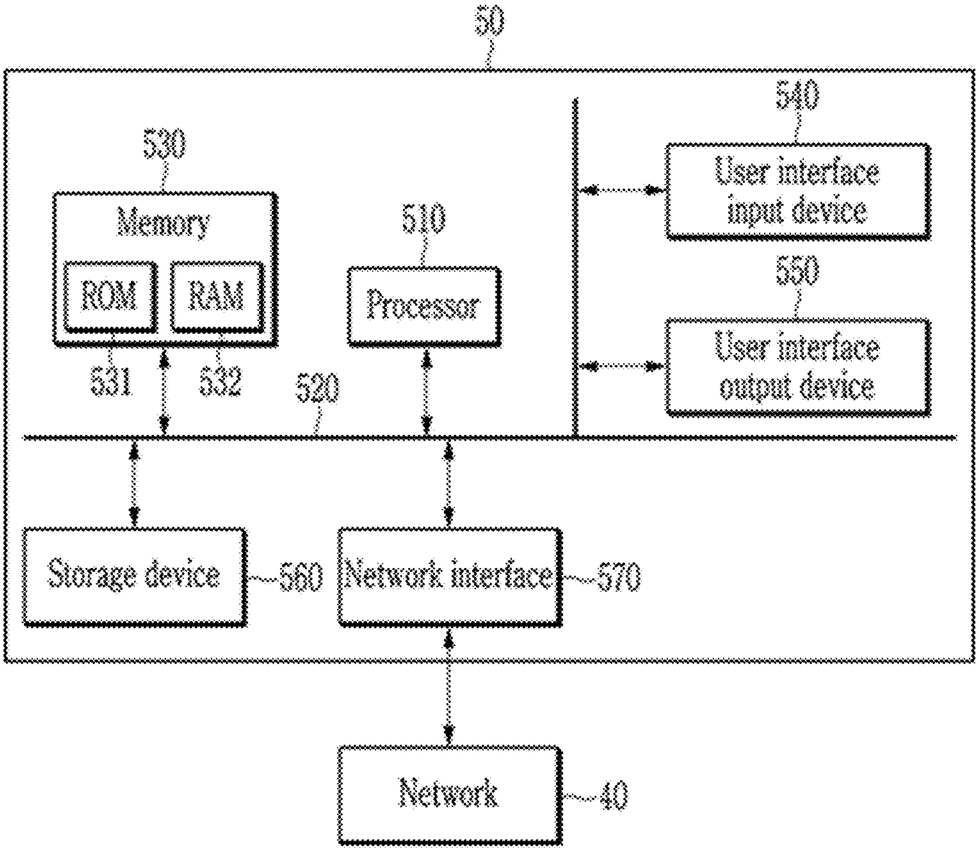
FIG. 5 is a diagram illustrating a computing device according to an exemplary embodiment of the present disclosure.

FIG. 5 is a diagram illustrating a computing device according to an exemplary embodiment of the present disclosure.

Referring now to FIG. 5, the cargo compartment door open driving warning method and means a device according to the example embodiments may be implemented by use of a computing device 50.

The computing device 50 may include at least one of a processor 510, a memory 530, a user interface input device 540, a user interface output device 550, and a storage device 560 communicating via a bus 520. The computing device 50 may also include a network interface 570 electrically connected to the network 40. The network interface 570 may transmit or receive a signal with another entity through the network 40.

The processor 510 may be implemented in various types, such as a micro controller unit (MCU), application processor (AP), a central processing unit (CPU), a graphic processing unit (GPU), a neutral processing unit (NPU), and a quantum processing unit (QPU), and may be a predetermined semiconductor device executing instructions stored in the memory 530 or the storage device 560. The processor 510 may be configured to implement the function and the method described above with reference to FIG. 1, FIG. 2, FIG. 3, and FIG. 4.

The memory 530 and the storage device 560 may include various forms of volatile or non-volatile storage media. For example, the memory may include a read only memory (ROM) 531 and a random access memory (RAM) 532. In some example embodiment, the memory 530 may be located inside or outside the processor 510, and the memory 530 may be connected to the processor 510 through already known various means.

In some exemplary embodiments of the present disclosure, at least some configurations or functions of the cargo compartment door open driving warning method and means a device according to the example embodiments may be implemented as programs or software executed on the computing device 50, and the programs or software may be stored on a computer-readable medium. A computer-readable medium according to the exemplary embodiment of the present disclosure may record a program for executing the operations included in an implementation of the cargo compartment door open driving warning method and means a device according to the example embodiments on a computer including the processor 510 executing a program or instructions stored in the memory 530 or the storage device 560.

In some exemplary embodiments of the present disclosure, at least some configurations or functions of the cargo compartment door open driving warning method and means a device according to the example embodiments may be implemented using hardware or circuit of the computing device 50, or may be implemented as separate hardware or circuit which may be electrically connected to computing device 50.

According to the exemplary embodiments of the present disclosure, when a purpose built vehicle travels with a door of a cargo compartment mounted for loading cargo open, it is possible to prevent accidents and provide safety during cargo delivery by warning for the opening of the door.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person having ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A cargo compartment door open driving warning method for providing an open driving warning for a door of a cargo compartment mounted for cargo loading in a vehicle, the vehicle being a purpose built vehicle (PBV), the cargo compartment door open driving warning method comprising:

determining, by a processor, whether the vehicle is a cargo vehicle;

in response that the processor concludes the vehicle is the cargo vehicle, activating, by the processor, a door open driving warning mode;

setting, by the processor, the door open driving warning mode to one of a plurality of predetermined operation modes, wherein the plurality of predetermined operation modes includes a first operation mode and a second operation mode;

detecting, by the processor, that the door of the cargo compartment is open;

in response that the door open driving warning mode is the first operation mode and the door of the cargo compartment is open, outputting a warning alarm regardless of a speed of the vehicle;

determining, by the processor, whether the speed of the vehicle exceeds a predetermined reference speed in response that the door open driving warning mode is the second operation mode and the door of the cargo compartment is open; and outputting, by the processor, the warning alarm in response that the speed of the vehicle exceeds the predetermined reference speed.

2. The cargo compartment door open driving warning method of claim 1, further including:

detecting, by the processor, a door closure of the cargo compartment; and terminating, by the processor, an output of the warning alarm in response that the door closure of the cargo compartment is detected.

3. The cargo compartment door open driving warning method of claim 1, wherein the plurality of operation modes further includes a third operation mode, and wherein the cargo compartment door open driving warning method further includes, performing driving restriction to prevent the vehicle from moving, in response that the door open driving warning mode is the third operation mode and the door of the cargo compartment is open.

4. The cargo compartment door open driving warning method of claim 3, further including:

detecting, by the processor, a door closure of the cargo compartment; and terminating, by the processor, the driving restriction in response that the door closure of the cargo compartment is detected.

5. The cargo compartment door open driving warning method of claim 3, further including:

outputting, by the processor, a user interface querying a driver of the vehicle for releasing the driving restriction; and terminating, by the processor, the driving restriction in response that the driver requests the releasing of the driving restriction via the user interface.

6. The cargo compartment door open driving warning method of claim 3, wherein the performing of the driving restriction to prevent the vehicle from moving includes outputting the warning alarm along with the performing of the driving restriction.

7. The cargo compartment door open driving warning method of claim 1, wherein the determining of whether the vehicle is the cargo vehicle includes:

detecting receipt of a latch signal for the door of the cargo compartment; and determining that the vehicle is the cargo vehicle in response that the receipt of the latch signal for the door of the cargo compartment is detected.

8. The cargo compartment door open driving warning method of claim 7, further including:

automatically activating, by the processor, the door open driving warning mode in an operation mode designated as a default among the plurality of operation modes in response that the receipt of the latch signal for the door of the cargo compartment is detected.

9. The cargo compartment door open driving warning method of claim 1, wherein the setting of the door open driving warning mode includes receiving a setting of the door open driving warning mode from a driver via a user terminal of the driver in communication with the vehicle.

10. The cargo compartment door open driving warning method of claim 1, wherein the outputting of the warning alarm is performed through a user terminal of a driver communicating with the vehicle.

11. A cargo compartment door open driving warning apparatus for providing an open driving warning for a door of a cargo compartment mounted for cargo loading in a vehicle, the vehicle being a purpose built vehicle (PBV) by executing a program code loaded in one or more memory devices through one or more processors, wherein the program code is executed by the one or more processors to:

determine whether the vehicle is a cargo vehicle, in response that the one or more processors conclude the vehicle is the cargo vehicle, activate a door open driving warning mode, set the door open driving warning mode to one of a plurality of predetermined operation modes including a first operation mode and a second operation mode, detect that the door of the cargo compartment is open, in response that the door open driving warning mode is the first operation mode, and the door of the cargo compartment is open, output a warning alarm regardless of a speed of the vehicle, determine whether the speed of the vehicle exceeds a predetermined reference speed in response that the door open driving warning mode is the second operation mode and the door of the cargo compartment is open, and output the warning alarm in response that the speed of the vehicle exceeds the predetermined reference speed.

12. The cargo compartment door open driving warning apparatus of claim 11, wherein the program code is executed by the one or more processors to further:

detect a door closure of the cargo compartment, and terminate an output of the warning alarm in response that the door closure of the cargo compartment is detected.

13. The cargo compartment door open driving warning apparatus of claim 11, wherein the plurality of operation modes further includes a third operation mode, and wherein the program code is executed by the one or more processors to further perform driving restriction to prevent the vehicle from moving in response that the door open driving warning mode is the third operation mode and the door of the cargo compartment is open.

14. The cargo compartment door open driving warning apparatus of claim 13, wherein the program code is executed by the one or more processors to further:

detect a door closure of the cargo compartment, and terminate the driving restriction in response that the door closure of the cargo compartment is detected.

15. The cargo compartment door open driving warning apparatus of claim 13, wherein the program code is executed by the one or more processors to further:

output a user interface querying a driver of the vehicle for releasing the driving restriction, and terminate the driving restriction in response that the driver requests the releasing of the driving restriction via the user interface.

16. The cargo compartment door open driving warning apparatus of claim 13, wherein the performing of the driving restriction to prevent the vehicle from moving includes outputting the warning alarm along with the performing of the driving restriction.

17. The cargo compartment door open driving warning apparatus of claim 11, wherein the determining of whether the vehicle is the cargo vehicle includes:

detecting receipt of a latch signal for the door of the cargo compartment; and determining that the vehicle is the cargo vehicle in response that the receipt of the latch signal for the door of the cargo compartment is detected.

18. The cargo compartment door open driving warning apparatus of claim 17, wherein the program code is executed to further automatically activate the door open driving warning mode in an operation mode designated as a default among the plurality of operation modes in response that the receipt of the latch signal for the door of the cargo compartment is detected.

19. The cargo compartment door open driving warning apparatus of claim 11, wherein the setting of the door open driving warning mode includes:

receive a setting of the door open driving warning mode from a driver via a user terminal of the driver in communication with the vehicle.

20. The cargo compartment door open driving warning apparatus of claim 11, wherein the output of the warning alarm is performed through a user terminal of a driver communicating with the vehicle.

* * * * *